(12) United States Patent
Osborne

(10) Patent No.: US 11,839,205 B2
(45) Date of Patent: Dec. 12, 2023

(54) BEAR FOOT SNARE/CABLE RESTRAINT DELIVERY SYSTEM

(71) Applicant: Wesley Wade Osborne, Pulaski, PA (US)

(72) Inventor: Wesley Wade Osborne, Pulaski, PA (US)

(*) Notice: Subject to any disclaimer, the term of this patent is extended or adjusted under 35 U.S.C. 154(b) by 694 days.

(21) Appl. No.: 17/060,137

(22) Filed: Oct. 1, 2020

(65) Prior Publication Data
US 2021/0015089 A1    Jan. 21, 2021

Related U.S. Application Data

(63) Continuation-in-part of application No. 16/384,249, filed on Apr. 15, 2019, now Pat. No. 11,000,026.

(60) Provisional application No. 62/663,611, filed on Apr. 27, 2018.

(51) Int. Cl.
*A01M 23/34* (2006.01)
*A01M 23/24* (2006.01)

(52) U.S. Cl.
CPC .......... *A01M 23/34* (2013.01); *A01M 23/245* (2013.01)

(58) Field of Classification Search
CPC ............................ A01M 23/34; A01M 23/245
See application file for complete search history.

(56) References Cited

U.S. PATENT DOCUMENTS

| | | | | |
|---|---|---|---|---|
| 83,220 A * | 10/1868 | Stone | ..... | A01M 23/34 43/87 |
| 2,894,352 A * | 7/1959 | McDonald | ..... | A01M 23/34 43/87 |
| 3,965,607 A * | 6/1976 | Lee | ..... | A01M 23/24 43/87 |
| 5,062,237 A * | 11/1991 | Kitagawa | ..... | A01M 23/34 43/87 |
| 5,309,667 A * | 5/1994 | Ladzinski | ..... | A01M 23/34 43/87 |
| 2007/0266618 A1 * | 11/2007 | Sturgeon | ..... | A01M 23/34 43/73 |
| 2011/0289821 A1 * | 12/2011 | Bonnot | ..... | A01M 23/34 43/85 |
| 2014/0345188 A1 * | 11/2014 | Connolly | ..... | A01M 23/34 43/58 |
| 2016/0143263 A1 * | 5/2016 | Myers | ..... | A01M 23/34 43/87 |
| 2018/0338487 A1 * | 11/2018 | Cao | ..... | A01M 23/34 |

* cited by examiner

*Primary Examiner* — Christopher R Harmon
(74) *Attorney, Agent, or Firm* — The Lynch Law Group LLC; Kathleen Roznicki

(57) ABSTRACT

The invention relates to device that cooperates with a typical foot snare (i.e. a one comprised of a cable loop and spring compression) to capture an animal without harming the animal. The device is triggered by and relies on the momentum generated by an animal, such as a bear, when reaching into the device and pulling up the bait. The momentum of from the animal grabbing the bait actuates a cable loop foot snare via the compression spring and the cable loop ascends and closes around the appendage of the animal, with the lock securing the cable loop on the animal without harming the animal.

7 Claims, 13 Drawing Sheets

BEAR FOOT SNARE/CABLE RESTRAINT DELIVERY SYSTEM

This application claims priority to U.S. non-provisional application Ser. No. 16/384,249 filed on Apr. 15, 2019 which in turn claims priority to U.S. provisional patent application Ser. No. 62/663,611 filed on Apr. 27, 2018, the disclosure of which is fully incorporated into this current application.

Field of the invention: A bear foot snare/cable restraint delivery system. The invention relates to device that cooperates with a typical foot snare (i.e. a one comprised of a cable loop and spring compression) to capture an animal without harming the animal.

Background of the Invention: The capturing of animals for pelts and general animal control is a long-practiced art. Through the years attempts have been made to make animal foot snare traps, commonly operating via a triggering device, in a more selective and humane manner to the trapped animal prey. Several states and countries have now outlawed steel leg hold traps, and pressure continues to grow for more states to do the same. Typical devices in the field commonly consist of a trigger mechanism that activates a spring mechanism located on the device itself which actuates a typical cable foot snare which is detached from the device to capture the animal.

Summary of the invention: The delivery system device itself of the claimed invention does not comprise a spring mechanism as seen in other devices. The device is triggered by and relies on the momentum generated by an animal, such as a bear, when reaching into the device and pulling up the bait. The bait is attached to a cage structure located within the pipe. When pulled up, the cage structure via its fins propels a collar surrounding the outer diameter of the pipe to rise up quickly. Situated on the top edge of the collar is a loop of a typical cable foot snare. The cable foot snare is comprised with a lock to form and secure a cable loop around the pipe with some tension, the straight slack of the cable foot snare has a compression spring surrounding the cable. The momentum of the quick rising collar that stops at an apex actuates the cable loop foot snare via the compression spring and the cable loop ascends and closes around the appendage of the animal, with the lock securing the cable loop on the animal.

Figure 4:
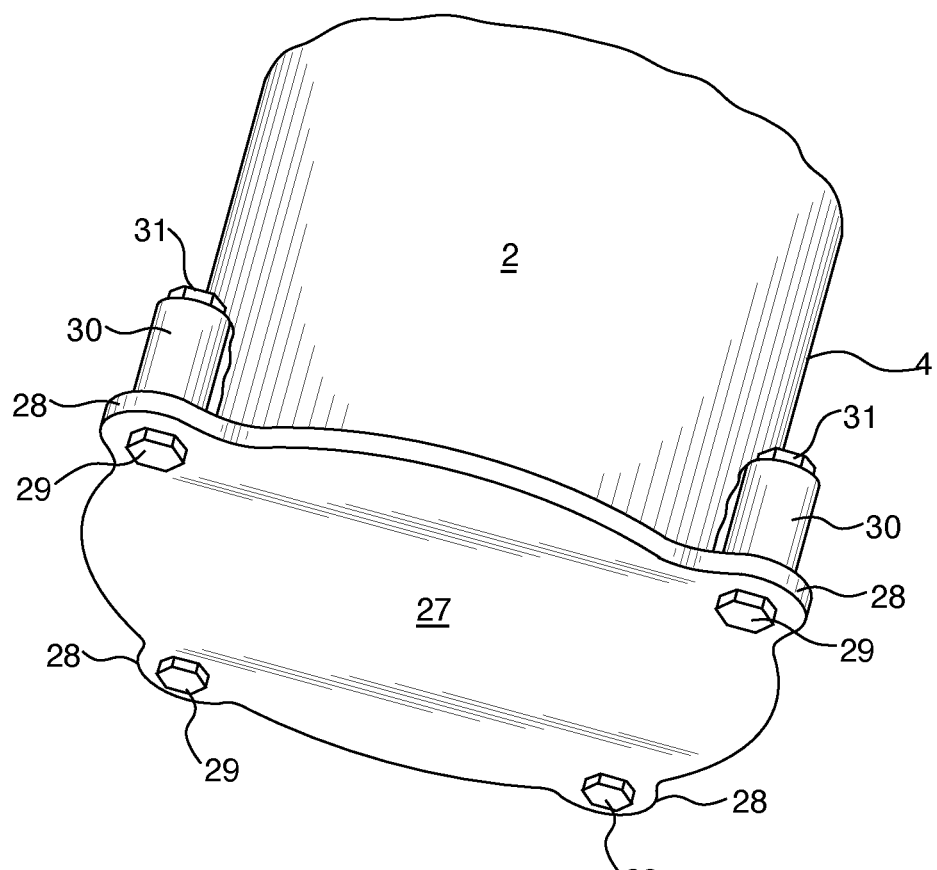

FIG. 4: a bottom view of one embodiment of the delivery system device.

Figure 5A:
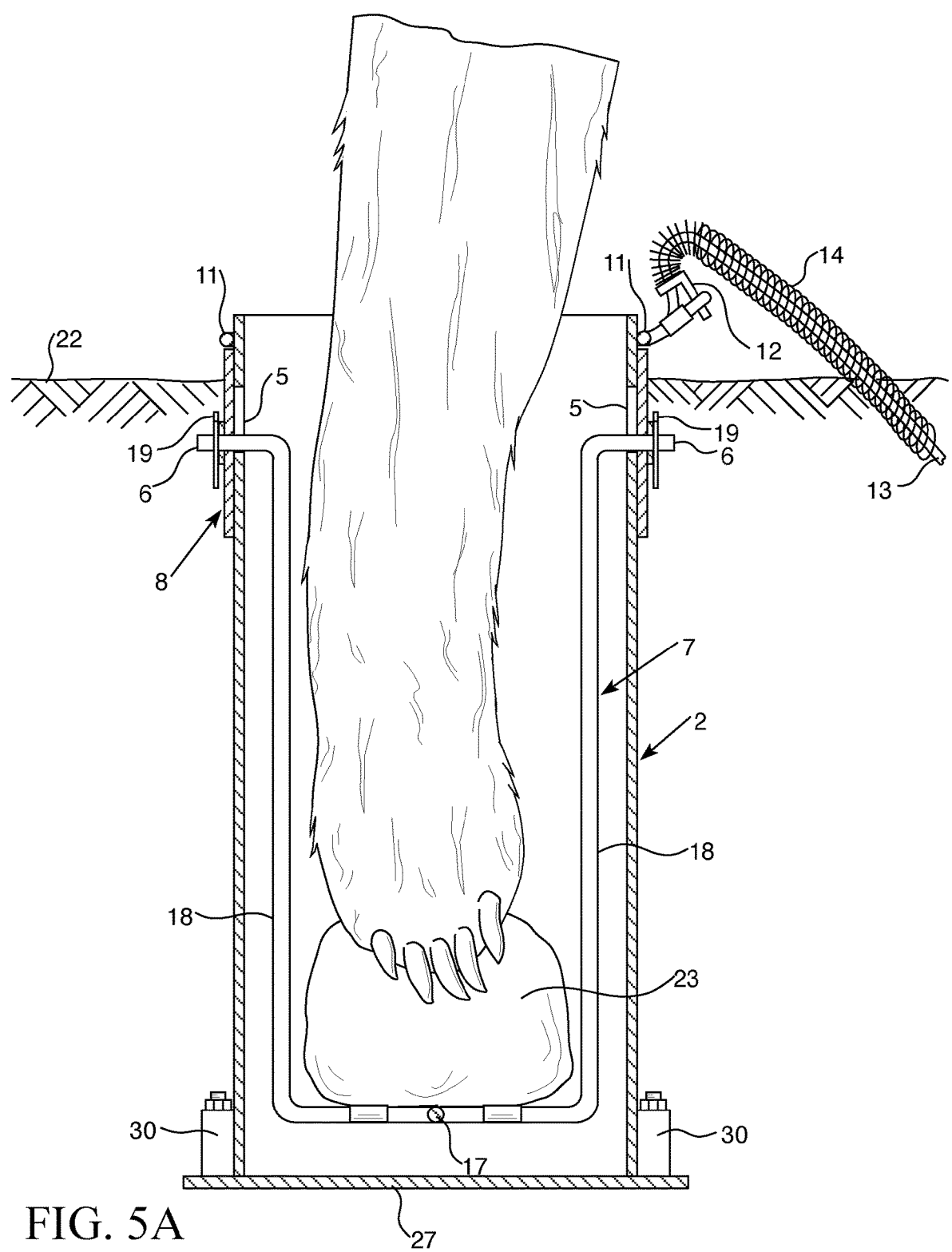

FIG. 5A shows a cut out view of one variation of an embodiment of the delivery system device where the bait sits within the cage before an animal sets off the device.

Figure 5B:
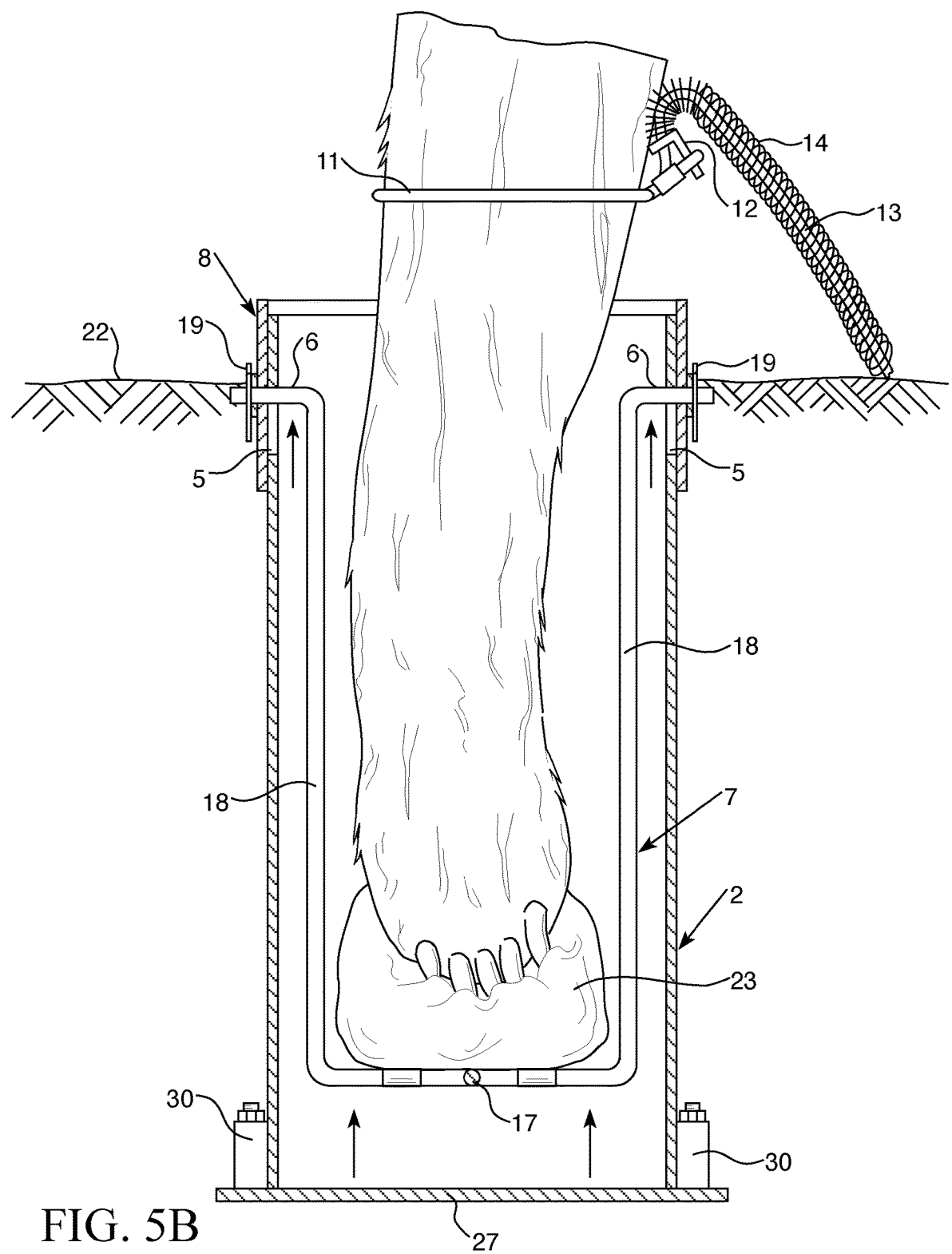

FIG. 5B shows a cut out view of the variation of the embodiment of the delivery system device in FIG. 5A after an animal sets off the device.

Figure 6A:
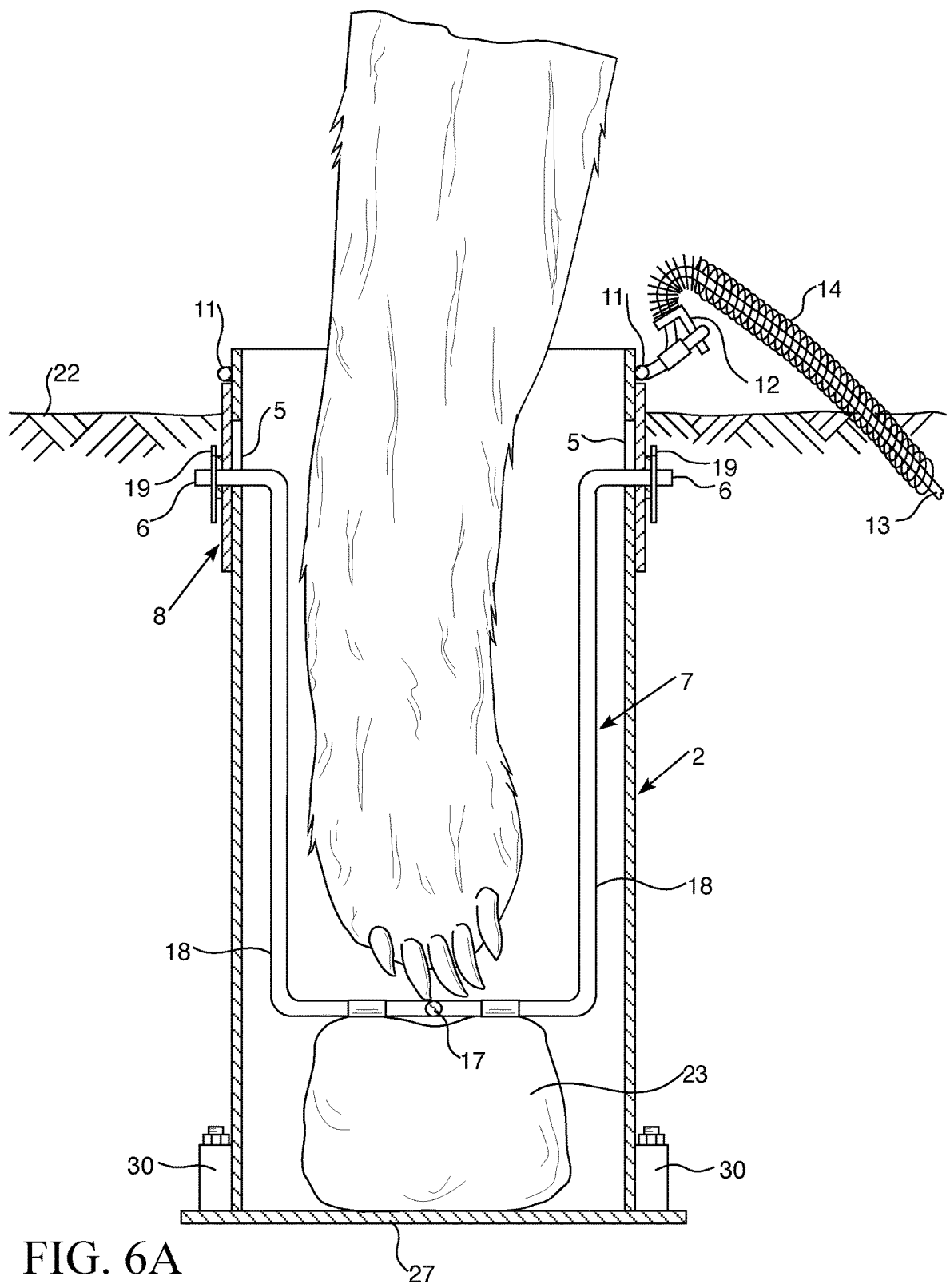

FIG. 6A shows a cut out view of a second variation of an embodiment of the delivery system device where the bait sits between the cage and the bottom plate before an animal sets off the device.

Figure 6B:
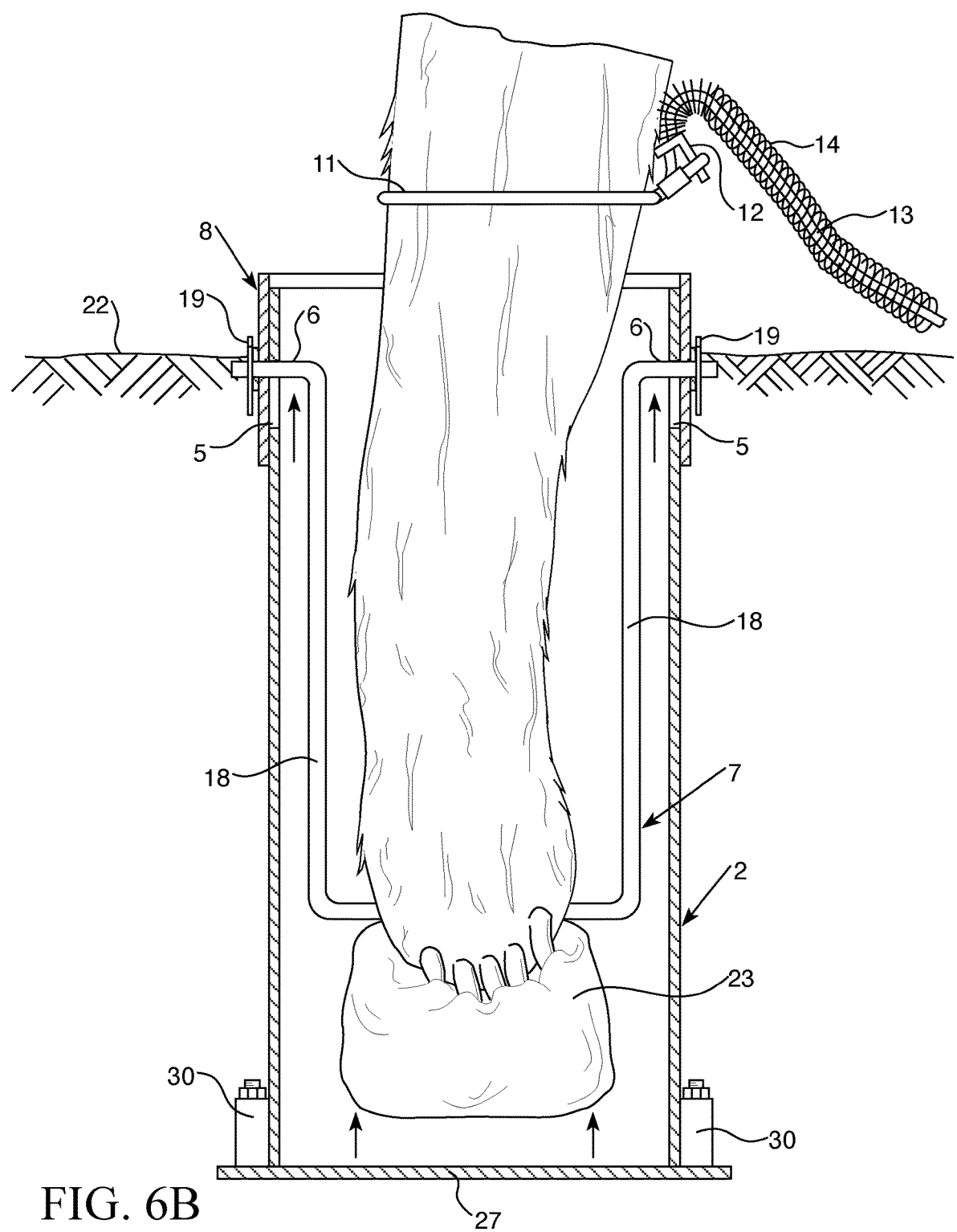

FIG. 6B shows a cut out view of the embodiment of the delivery system device in FIG. 6A after an animal sets off the device.

Figure 7:
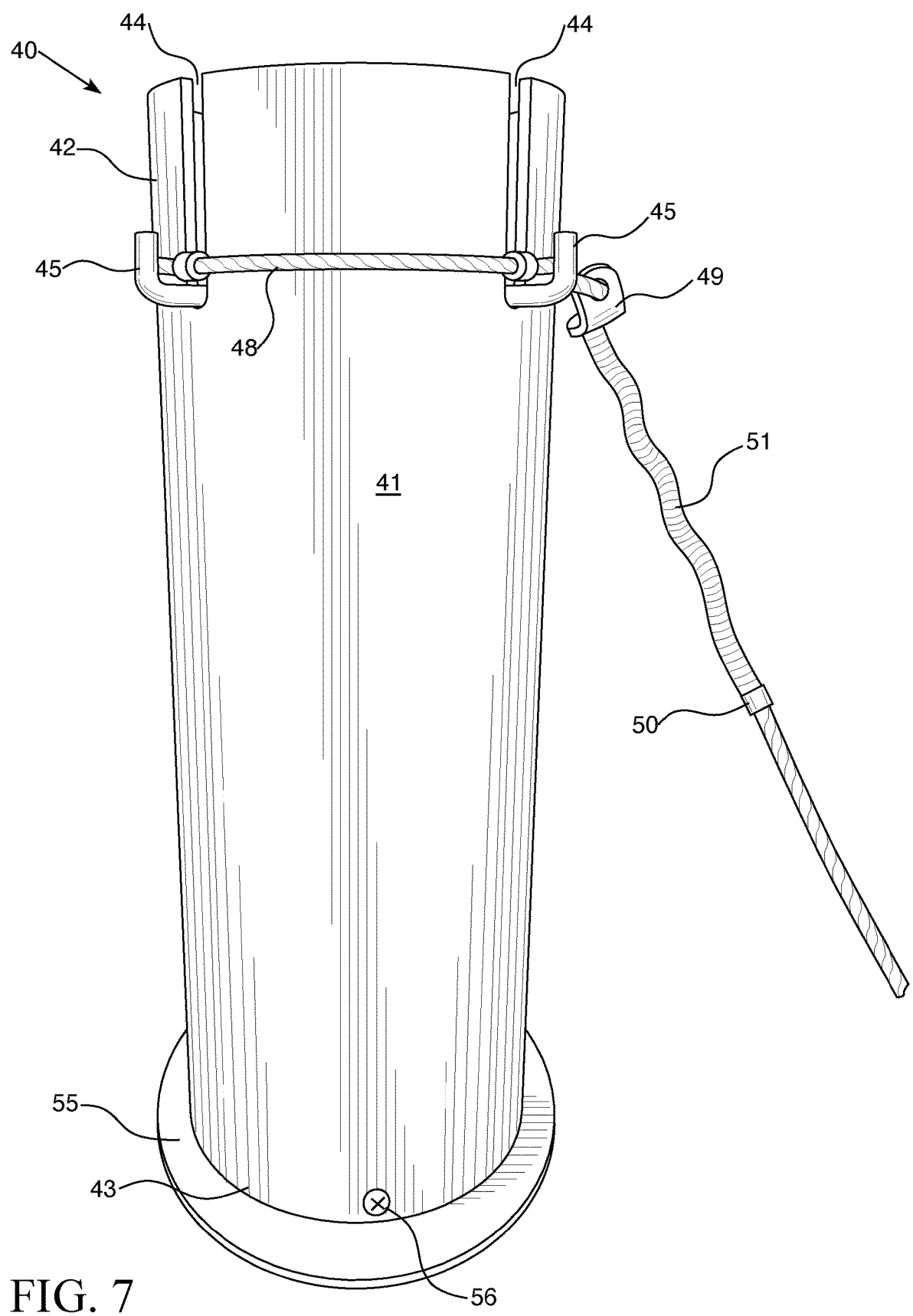

FIG. 7 shows a side view of an alternative embodiment of the delivery system device.

Figure 8:
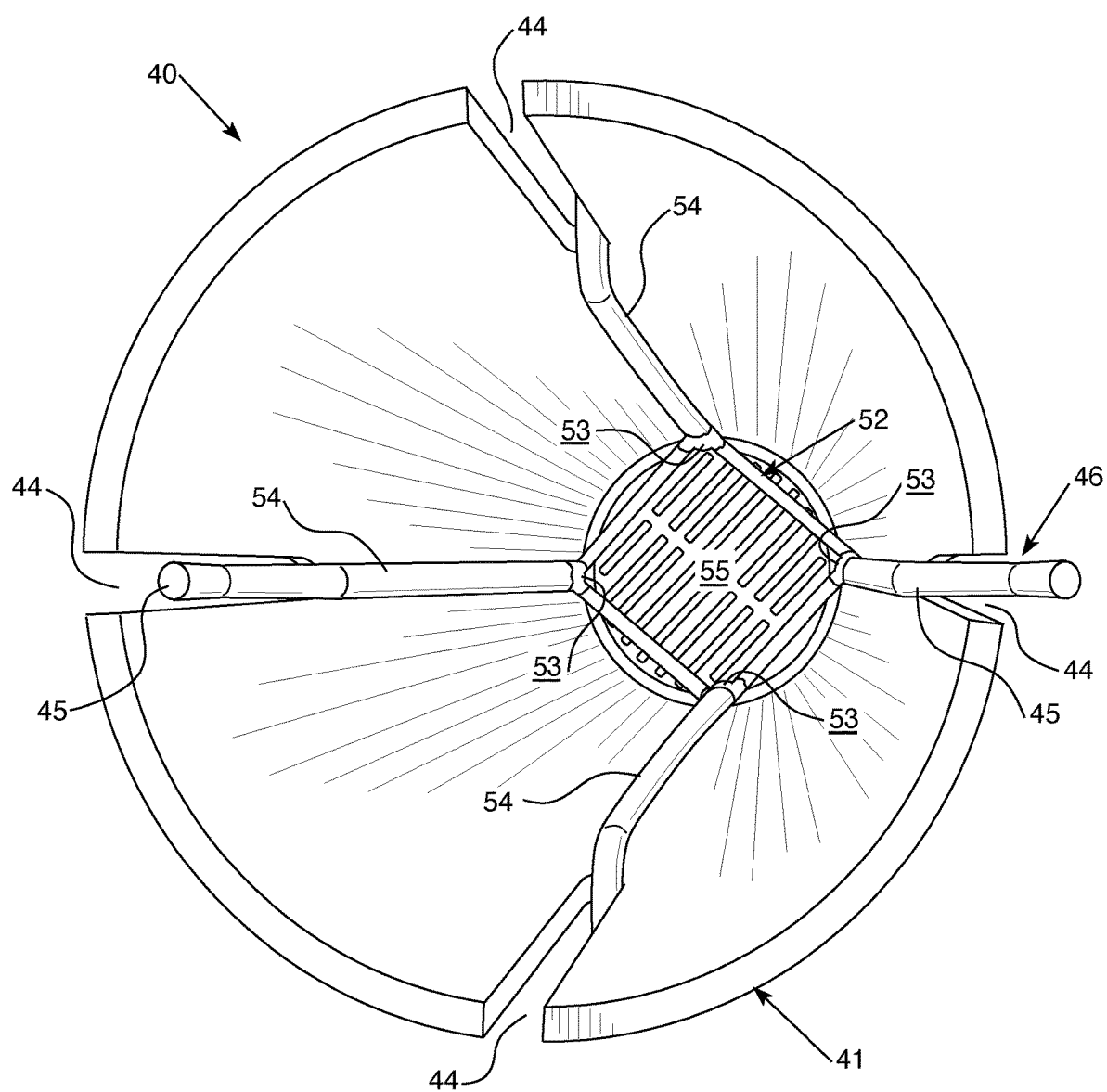

FIG. 8 shows a top-down view of the interior of an alternative embodiment of the delivery system device.

Figure 9:
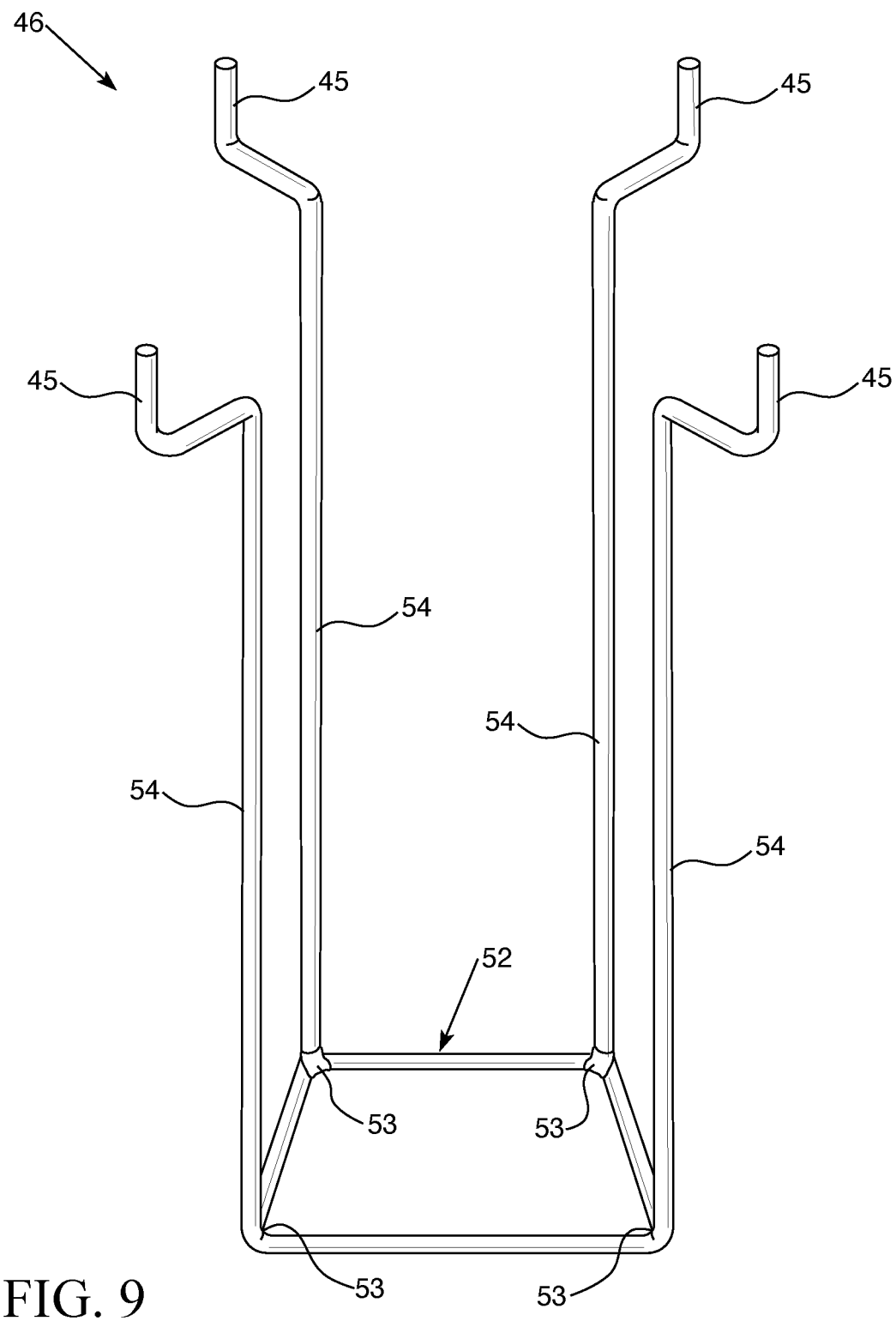

FIG. 9 shows a side view of a cage of an alternative embodiment of the delivery system device.

The device disclosed is for catching animals of any size from a mouse to a grizzly bear; including but not limited to raccoons, mountain lions (cougar, panther, or puma), bobcats, polar bears, brown bears, black bears, minks, foxes, beavers, skunks, rabbit, badgers, squirrel, pine marten, opossum, ground hog, and coyotes. The specific size of the device to be used will depend on the animal the user intends to capture. Though the device is primarily described as using steel for the material for the various structures and part, any material feasible for performing the function described, including but not limited to other steel compositions, PVC compositions, cardboard compositions, and aluminum compositions is contemplated by this disclosure. Preferably all materials used in the device are weather/moisture resistant.

One embodiment is described below and shown in the FIGS. 1, 2, 3A, 3B, and 4 as delivery system device 1. The device 1 comprises a pipe 2 which has a top end 3 and a bottom end 4. The pipe 2 also has slots 5 that are oriented vertically, that are evenly spaced apart from one another, and that are located towards the top end 3 of the pipe 2. Preferably the top curvature of each slot is located approximately an inch from the top end 3 of the pipe 2, preferably the size of each slot 5 is approximately an inch in length and the width is sized to fit a steel rod fin 6 which extends from the cage 7 as discussed below. However, the delivery system device of the claimed invention encompasses any size of slot, location of slots, and spacing of slots that is feasible for the device to function as depicted in FIGS. 5A/5B and FIGS. 6A/6B by allowing enough momentum to be generated by an animal pulling up the cage 7 by grabbing at the bait 23 that propels the upward movement of the collar 8 to reach an apex thereby causing the snare cable loop 11 to spring up snaring the animal. It is preferred that the pipe length of the delivery system device is long enough for an animal, such as a bear, to reach in up to approximately its elbow portion. The inside diameter of the pipe should be wide enough to fit animal claw/appendage (specific to the size of the animal desired, such as bear) but not so wide so as to let the head in beyond its snout. However, this disclosure contemplates any inside and outside diameters of size that allows the device to function as described above and in FIGS. 5A/5B and FIGS. 6A/6B. The pipe material itself should be of sufficient thickness to give the pipe sufficient weight to function properly as described below. The preferred material is for the pipe is schedule 10 steel. However, this disclosure contemplates the pipe to be any composition of material allows the device to function as described such as, but not limited to other steel compositions, PVC compositions, cardboard compositions, aluminum compositions. Also, the claimed invention encompasses any size and thickness of pipe that is feasible for the device to function as described.

Surrounding the outer diameter of the pipe is a collar 8 with collar holes 9 that are evenly spaced and that align with the slots 5 of the pipe 2. Preferably, the collar 8 is sufficient in length such that it cannot be grasped and manipulated by animal, such as a bear, using its claw, and the evenly spaced collar holes 9 are located approximately in the center of the length. However, the delivery system device of the claimed invention encompasses any size of collar and placement of holes that is feasible for the device to function as described above and in FIGS. 5A/5B and FIGS. 6A/6B. The collar 8 has a top edge 10 on which a typical snare cable loop 11 sits with slight tension via its lock 12 to secure on to the top edge 10 of collar 8 surrounding the outer diameter of the pipe 2. The non-loop part of cable, the straight slack 13, on the other side of the lock 12 is further comprised of a compression spring 14 surrounding the straight slack 13 that attaches at the far end to a second cable loop (not shown) that used for anchoring (typical techniques are known to those with skills in the art). The collar top edge 10 sits roughly one inch below the top end 3 of pipe 2, though this disclosure contemplates any distance from the top end of the pipe that allows the device to function as described above and in FIGS. 5A/5B and FIGS. 6A/6B. Preferably the collar is comprised of drawn over mandrel steel and has an inside diameter sized to fit comfortably over the outer diameter of the pipe with minimal gap and is of a thickness sufficient to hold the cable loop of a foot snare. However, this disclosure contemplates the collar to be any composition of material such as, but not limited to other steel compositions, PVC compositions, cardboard compositions, aluminum compositions, and any inside and outside diameters of size that allows the device to function as described in FIGS. 5A/B and 6A/B. Optionally, on the top edge of the collar is a groove designed specifically to hold the loop of the snare cable loop. Any type of cable snare commonly used for snaring animals is contemplated by this disclosure and functions in a manner as expected by those with skill in the art. Common construction of cable snares known to those with skill in the art include, but are not limited to "1×7", "7×7", "7×19", and "1×19". Single ferrule or double ferrule cable snares are also contemplated by this disclosure. Cable snares with or without swivels are contemplated by this disclosure. Compositions include but are not limited to galvanized aircraft cable, stainless steel cable, or any other equivalents known to those with skill in the art. Diameter thickness of individual cables in the snare cable loop will depend on the animal intended to be snared. Size of the snare cable loop used depends on the animal intended to be snared. Total length of the cable will depend on the overall size of the device, which is dependent on the size of the animal to be snared.

Figure 1A:
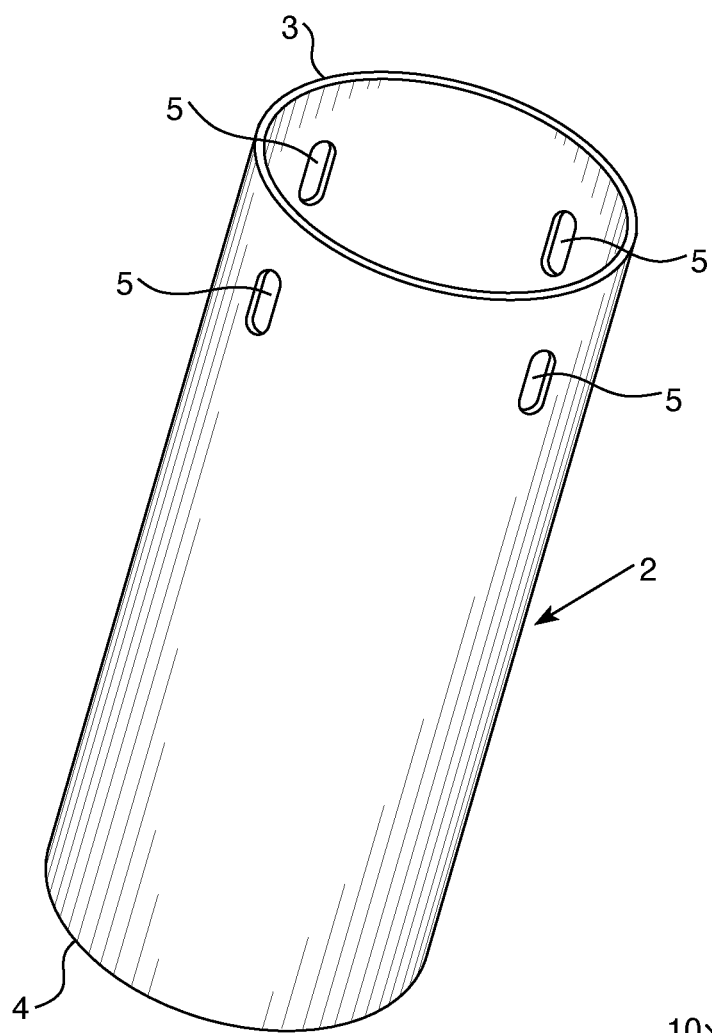
FIG. 1A shows a pipe of an embodiment of the delivery system device.
Figure 1B:
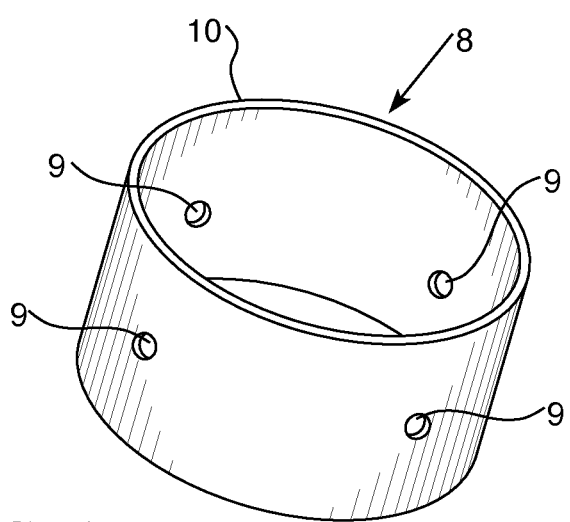
FIG. 1B shows a collar of an embodiment of the delivery system device.
Figure 1C:
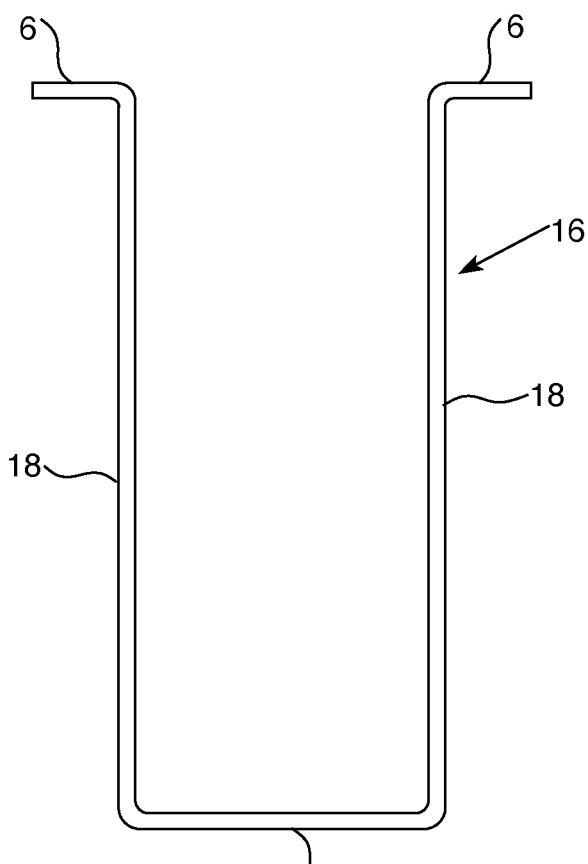
FIG. 1C shows an individual hat shaped rod of an embodiment of the delivery system device.
Figure 1D:
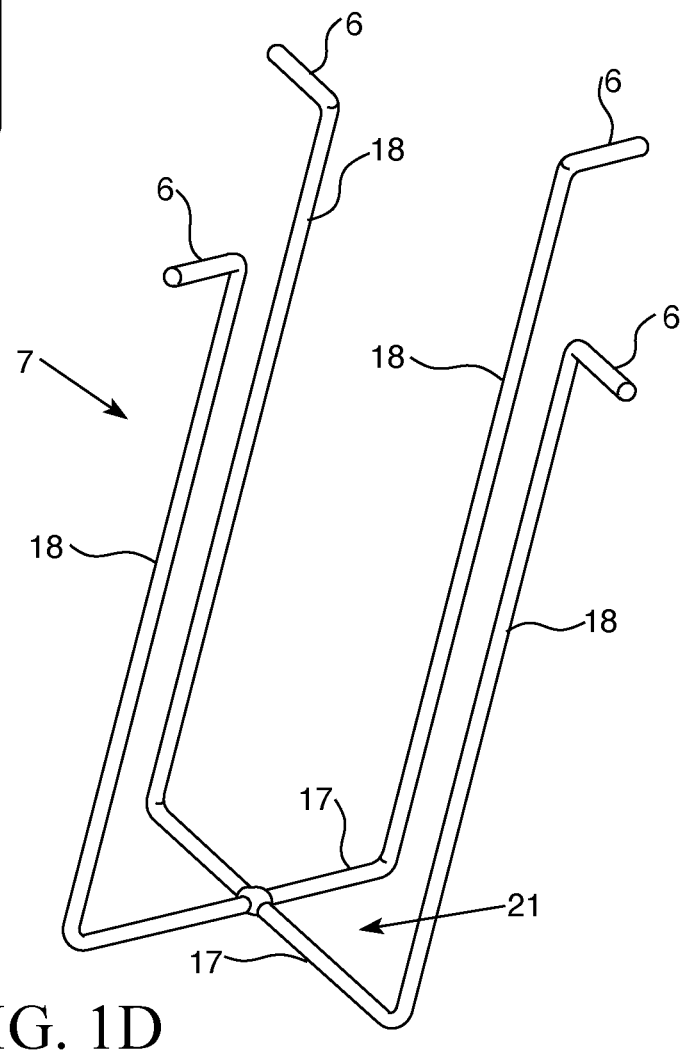
FIG. 1D shows a cage of an embodiment of the delivery system device.
Figure 2:
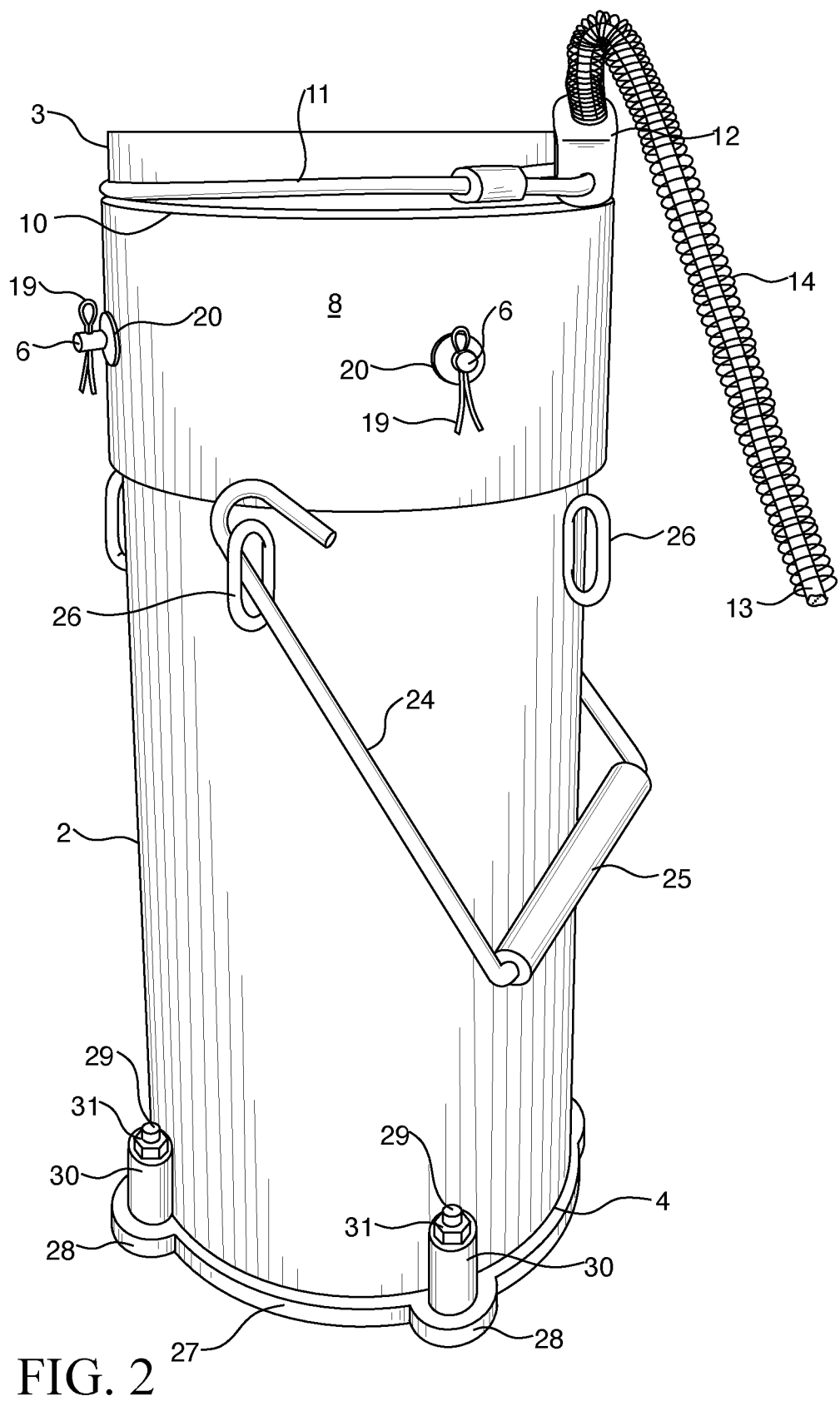
FIG. 2 shows a side view of one embodiment of the delivery system device.
Figure 3A:
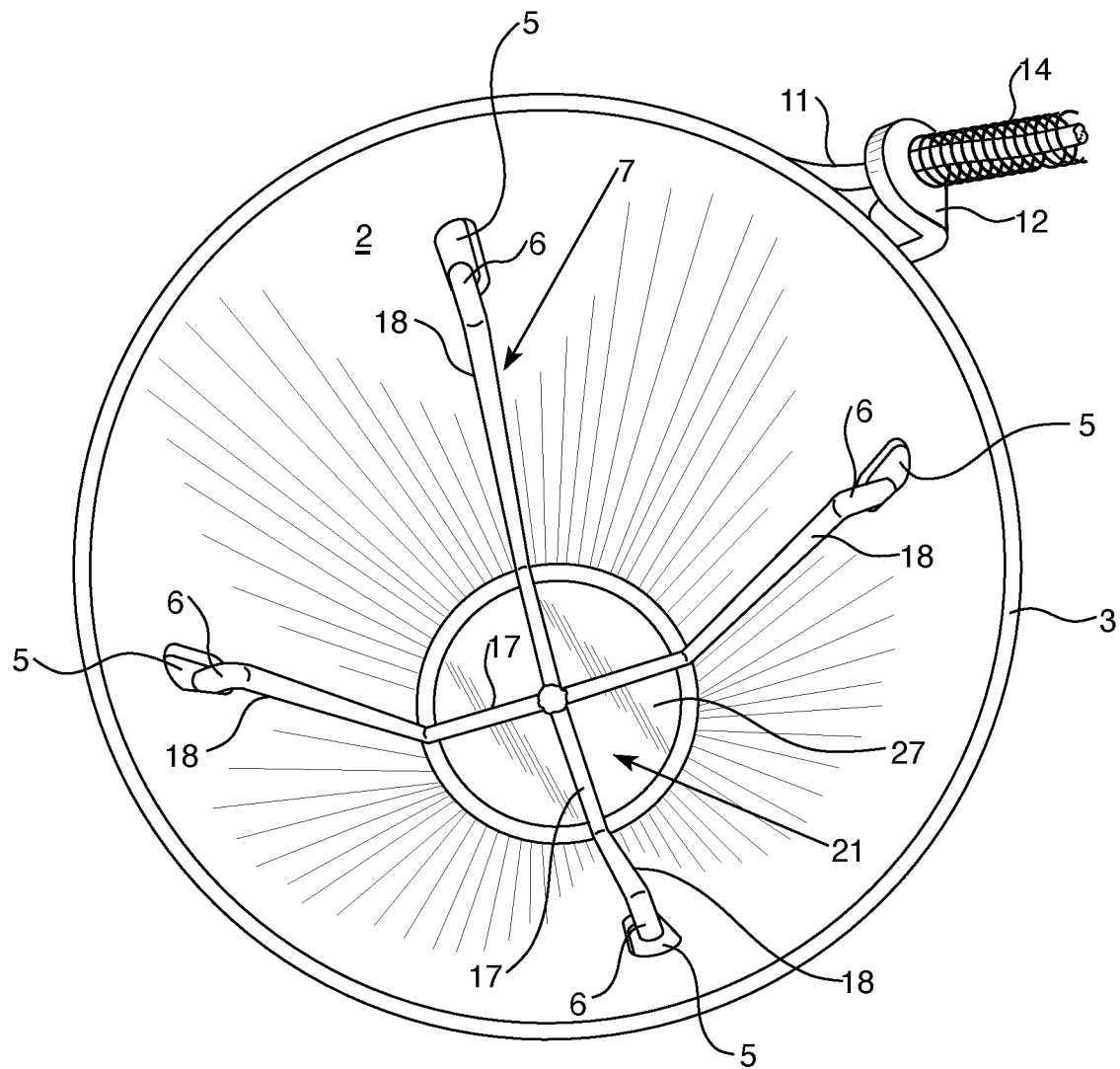
FIG. 3A shows a top perspective view of one embodiment of the delivery system device.
Figure 3B:
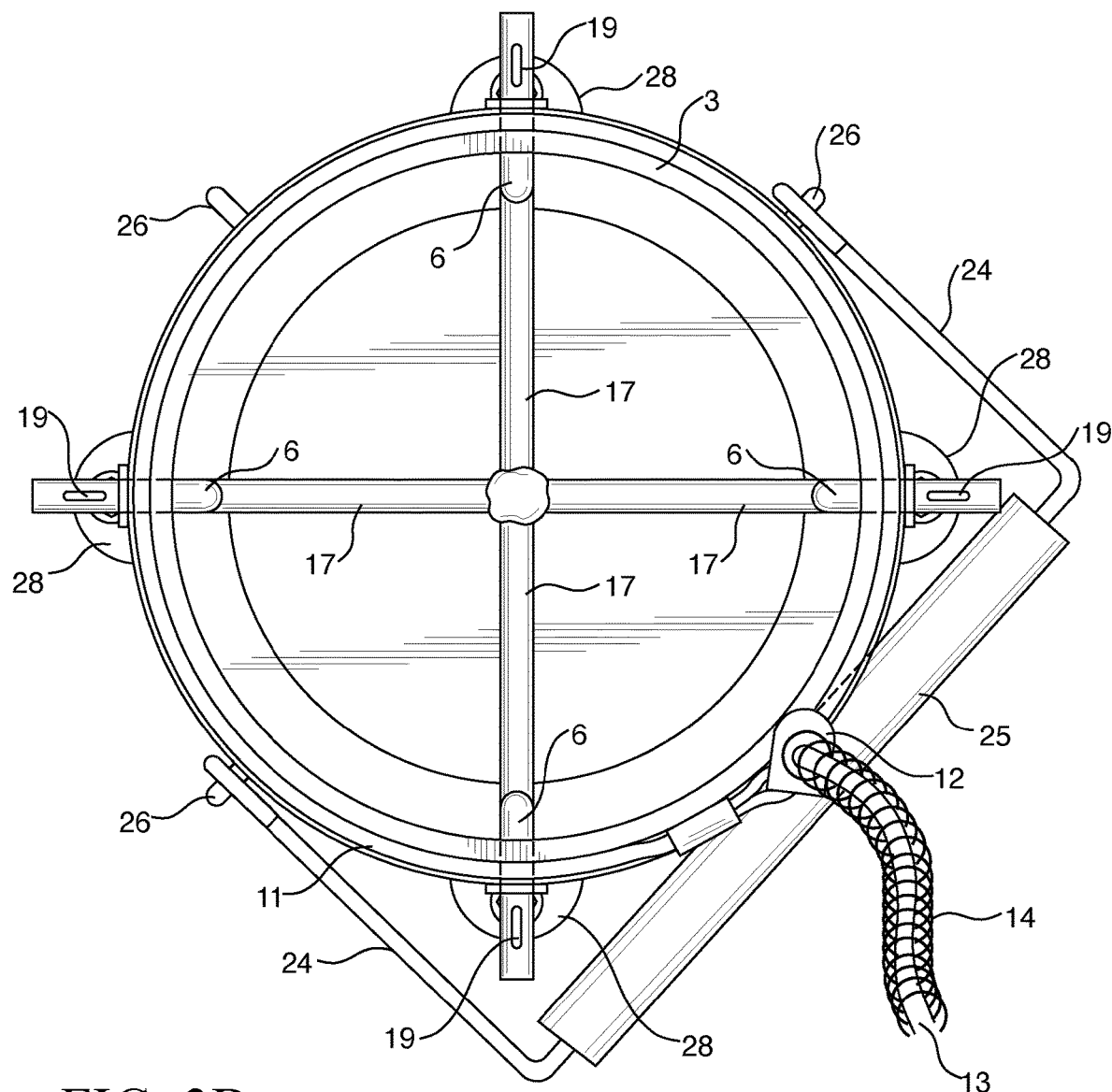
FIG. 3B shows a top view of one embodiment of the delivery system device.

Disposed within the pipe 2 is a cage 7. As depicted in the embodiment shown in FIGS. 1D, 3A, and 3B, the cage 7 is comprised of two hat shaped rods 16. Each hat shaped rod 16 is a round stock rod that is U-shaped with lateral projecting fins and each hat shaped rod 16 is sized appropriately to fit snuggly within pipe 2 from the slots 5 to near the bottom end 4 of the pipe 2 as shown in the FIGS. 3, 5A, and 6A. A middle portion (top of hat) 17 of rod 16 lies flat across the diameter of the pipe 2 and located towards the bottom end 4 of the inner diameter of pipe 2, adjacent to middle portion are side portions (sides of hat) 18 that are bent perpendicular to the middle portions 17 and the side portions 18 run vertically along the inner diameter of the pipe 2 and extend to the slots 5, adjacent to each side portion 18 are fins (brim of hat) 6 that are bent perpendicular to the side portions 18 and projecting laterally and the fins 6 are sized in length to go through the slots 5 and extend beyond outside diameter of the pipe 2 and extend beyond the outside diameter of the adjacent collar 8 through collar holes 9. Biased towards the very lateral end of each fin is a means to hold a securing mechanism. The securing mechanism is used to attach the collar to the pipe because the collar rests on the fins of the cage that extends through holes and slots. Any securing mechanism known in the art is contemplated by this disclosure. A preferred securing mechanism, as shown in FIG. 2, is to use a cotter key 19 that is inserted through a hole (not shown) in the lateral end of the fin 6; the cotter key 19 being bent at its ends and use in conjunction with a washer 20. Preferably as seen in FIG. 3, two hat shaped rods 16 are set inside of the pipe 2 perpendicular to one another and welded to together via the center of middle portions forming a cross 21 at bottom end 4 of pipe 2. Adjacent to each middle portion 17 the lateral ends are perpendicular side portions 18 (four side portions in total) and on the lateral end of each side portion 18 is a perpendicular laterally projecting fin 6 (four fins in total) that extends through one of the vertical slots 5 and is positioned at bottom of a slot 5. A cage with just a single rod forming two side portions and two fins is also contemplated by this disclosure, as well as a plurality of hat shaped rods greater than two. Preferably the rods are comprised of ¼ inch 308 stainless steel round stock, however any comparable material known in the art is contemplated by this disclosure. Any feasible way known in the art to structure the steel rod to form the hat shape is contemplated by this disclosure.

To function as shown in FIGS. 5A/5B, the device preferably will be buried into ground 22 up to just below top edge 10 of the collar 8 with the ground 22 surrounding the collar 8 not being tightly packed. The bait 23 is attached to the middle portions 17 at the bottom end 4 of pipe 2. The bait 23 can be presented in any way known to those skilled in the art. Typically, a food source is placed in a sock or in an equivalent sack-like material. When an animal, such as a bear, reaches in with its appendage to grab the bait 23 and uses its claws to pull the cage 7 up, the fins 6 of the hat shaped rods 16 of the cage 7 slide up to causing the collar 8 to rise rapidly. When the fins 6 hit an apex at the top curvatures of slots 5, the momentum generated by the action of the collar 8 rising rapidly and then rapidly stopping actuates the compression spring 14 of the straight slack 13, causing the foot snare cable loop 11 which is seated with slight tension to rise up off of the top edge 10 of the collar 8 and quickly onto an appendage of the animal with the snare cable loop 11 then releasing the tension and closing on the appendage of the animal via the lock 12; capturing the animal without harming the animal. In the variation shown in FIGS. 5A/5B, the bait 23 is placed within the cage 7 and is attached on top of middle portions 17. In an alternative variation as shown in FIGS. 6A and 6B, the bait 23 can be placed between the cage 7 and the bottom plate 27 if present, or place under between the cage 7 and ground, and attached to and below the middle portions 17. The device shown in FIGS. 6A/6B functions in the same way as the device in FIGS. 5A/5B. FIGS. 5A and 6A depict the device before an animal triggers it and FIGS. 5B and 6B depict the device after an animal triggers it. Though the device in FIGS. 5A/B and 6A/B show the device being mostly buried underground, alternatively the device can be only partially buried or a not buried at all when used and anchored to the ground by any means known to those with skill in the art whether using loops 26 or any other anchoring means.

Embodiments of the device such as that shown in FIG. 2 may comprise a handle 24 connected by any means known to those with skill in the art to the pipe for ease of carrying. Preferably the handle 24 is made of steel round stock and is partially covered on the grasping part in rubber 25 to prevent noise of steel clanging. In-the embodiment as seen in FIG. 2, loops 26 can be welded onto the outer diameter of the pipe 2. The loops 26 can also be used to anchor the device to the ground by any means known in the art and/or as a means for attachment of the handle 24 as seen in FIG. 2. In some embodiments as seen in FIG. 4, a bottom plate 27 can be attached to the bottom end 4 of the pipe 2 by any means known to those with skill in the art. In the embodiments shown in FIGS. 2 and 4, bottom plate 27 is a disc with four evenly spaced bumps 28 along its circumference. Each bump 28 is comprised of a hole (not shown) for receiving a bolt 29. On the outer circumference of the pipe and welded near the bottom end of pipe 2, are bushings 30 capable of receiving bolt 29. Nuts 31 are used to secure the bottom plate to the pipe. Optionally a rubber gasket (not shown) can be used to seal the interface between the bottom plate 27 and the bottom end 4 of the pipe 2. Using a bottom plate and a seal or any type of bottom configuration can protect the bait from moisture and insects that would otherwise get into the pipe while buried into the ground. However, any feasible bottom plate design and bottom configuration that seals the bottom end of the inner diameter of the pipe from the ground is contemplated by this disclosure. Alternatively, a device with no bottom plate or bottom configuration is also contemplated by this disclosure.

An alternative embodiment is described below and shown in the FIGS. 7-9. The device 40 comprises a pipe 41 which has a top end 42 and a bottom end 43. The pipe 41 also has slots 44 that are oriented vertically, that are evenly spaced apart from one another, and that are open ended at the top end 42 of the pipe 41. Preferably the size of each slot 44 is approximately 3 inches in length and the width is sized to fit an L-shaped fin 45 which extends from the cage 46 as discussed below. However, the delivery system device of the claimed invention encompasses any size of slot, location of slots, and spacing of slots that is feasible for the device to function as similar as depicted and described in principal in FIGS. 5A/B-6A/B by allowing enough momentum to be generated by an animal pulling up the cage 46 by grabbing at the bait (not shown) that propels the upward movement of the snare cable loop 48 to reach an apex whereby tension is released and the snare cable loop 48 springs up snaring the animal. It is preferred that the pipe length of the delivery system device is long enough for an animal, such as a bear, to reach in up to approximately its elbow portion. The inside diameter of the pipe should be wide enough to fit animal claw/appendage (specific to the size of the animal desired, such as bear) but not so wide so as to let the head in beyond its snout. However, this disclosure contemplates any inside and outside diameters of size that allows the device to function similarly as depicted and described in principal in FIGS. 5A/B-6A/B. Those with skill in the art will recognize that both devices function in principal in similar manner, whereby momentum is triggered by an animal grabbing bait attached to the cage, propelling the cage upward, whereby the snare cable loop is also propelled upward above the top end of the pipe around the appendage of an animal, whereby the tension in the loop is released and the loop closes around the appendage of the animal. The pipe material itself should be of sufficient thickness to give the pipe sufficient weight to function properly as described below. The preferred material is for the pipe is schedule 10 steel. However, this disclosure contemplates the pipe to be any composition of material allows the device to function as described such as, but not limited to other steel compositions, plastic compositions, PVC compositions, cardboard compositions, aluminum compositions. Also, the claimed invention encompasses any size and thickness of pipe that is feasible for the device to function as described.

L-shaped fins 45 are shaped with a space on which a typical snare cable loop 48 sits with slight tension around the outside diameter of pipe 41 via its lock 49 to secure on to surrounding the outer diameter of the pipe 41. The non-loop part of cable, the straight slack 50, on the other side of the lock 49 is further comprised of a compression spring 51 surrounding the straight slack 50 that attaches at the far end to a second cable loop (not shown) that used for anchoring (typical techniques are known to those with skills in the art). Each L-shaped fin 45 sits in a slots 44 roughly three (3) inches below the top end 42 of pipe 41, though this disclosure contemplates any distance from the top end of the pipe that allows the device to function as described above and in Figures X. L-shaped fins 45 are designed specifically to hold the loop of the snare cable loop 48. Any type of cable snare commonly used for snaring animals is contemplated by this disclosure and functions in a manner as expected by those with skill in the art. Common construction of cable snares known to those with skill in the art include, but are not limited to "1×7", "7×7", "7×19", and "1×19". Single ferrule or double ferrule cable snares are also contemplated by this disclosure. Cable snares with or without swivels are contemplated by this disclosure. Compositions include but are not limited to galvanized aircraft cable, stainless steel cable, or any other equivalents known to those with skill in the art. Diameter thickness of individual cables in the snare cable loop will depend on the animal intended to be snared. Size of the snare cable loop used depends on the animal intended to be snared. Total length of the cable will depend on the overall size of the device, which is dependent on the size of the animal to be snared.

Disposed within the pipe 41 is a cage 46. As depicted in the embodiment shown in FIGS. 7-9, the cage 46 is comprised of an anchor 52 with angle points 53, extended from each angle point 53 of the anchor is a vertical rod 54 projecting upwards, attached to vertical rod 54 is an L-shaped fin 45, each L-shaped fin 45 projects through and rests on each slot 44 of pipe 41. The cage 46 is sized appropriately to fit snuggly within pipe 41 from the slots 44 to near the bottom end 43 of the pipe 41 as shown in the FIG. 8. The anchor 52 lies flat across the diameter of the pipe 41 and located towards the bottom end 43 of the inner diameter of pipe 41. As shown the anchor is square shaped, but any feasible shape (Triangular pentagon, hexagon, etc.) with angle points and having extended and projecting upwards from each angle point is a vertical rod with an L-shaped fin is contemplated by this disclosure. A cage with linear anchor and just two vertical rods and two L-shaped fins is also contemplated by this disclosure. An alternative cage may be comprised of hat shaped rods similar to that described above, with the fins in this configuration being L-shaped fins and the anchor being a cross shape, from the lateral ends of the arms forming the cross shape are the vertical rods projecting upwards with the L-shaped fins. Preferably the rods are comprised of ¼ inch 308 stainless steel round stock, however any comparable material known in the art is contemplated by this disclosure. Any feasible way known in the art to structure the steel rod to form the cage is contemplated by this disclosure.

To function, the device can be partially buried into ground, or secured to the ground by any means known to those with skill in the art. Similarly as depicted in FIGS. 5A/B and 6A/B, the bait is attached to the anchor 52 (roughly equivalent to the middle portions 17) at the bottom end 43 of pipe 41. The bait can be presented in any way known to those skilled in the art. Typically, a food source is placed in a sock or in an equivalent sack-like material. When an animal, such as a bear, reaches in with its appendage to grab the bait and uses its claws to pull the cage 46 up, causing the L-Shaped fins 45 of the vertical rods 54 slide up to causing the cable snare loop 48 to rise rapidly. When the L-shape fins 45 rise up out of the slots 44 above the top end 42 of pipe 41, the momentum generated by that action actuates the compression spring 51 of the straight slack 50, causing the snare cable loop 48 which is wrapped with slight tension around the pipe 41 to rise up off of the L-shaped fins 45 and quickly around an appendage of the animal with the snare cable loop 48 then releasing the tension and closing on the appendage of the animal via the lock 49; capturing the animal without harming the animal.

Similar as depicted as the variation shown in FIGS. 5A/5B, the bait can be placed within the cage 46 and is attached on top of anchor 52. Similar to the alternative variation as shown in FIGS. 6A and 6B, the bait can be placed between the cage 46 and the bottom plate 55 if present (described more below), or place under between the cage 46 and ground, and attached to and below the anchor 52. Those with skill in the art will recognize that the device depicted in FIGS. 7-9 will function in a similar manner with regards to animal trigger as snare as that depicted in and described for FIGS. 5A/B and 6A/B. Though the device can be mostly buried underground, alternatively the device can be only partially buried or a not buried at all when used and anchored to the ground by any means known to those with skill in the art.

The pipe 41 of the device can be inserted into ground directly or attached to a bottom stage 55, said bottom stage 55 secured to the bottom end 43 of pipe 41 by any means known to those skilled in the art such as using screws 56 as shown in FIG. 7. Optionally a rubber gasket (not shown) can be used to seal the interface between the bottom stage 55 and the bottom end 43 of the pipe 41. Using a bottom stage and a seal or any type of bottom configuration can protect the bait from moisture and insects that would otherwise get into the pipe while buried into the ground. Though shown as having a slotted section within pipe 41, any feasible bottom stage design including that section being solid, and any bottom configuration that seals the bottom end of the inner diameter of the pipe from the ground is contemplated by this disclosure. Alternatively, a device with no bottom stage or bottom configuration is also contemplated by this disclosure.

The foregoing description merely illustrates the invention is not intended to be limiting. It will be apparent to those skilled in the art that various modifications can be made without departing from the inventive concept. Accordingly, it is not intended that the invention be limited except by the appended claims.

The invention claimed is:
1. A device for snaring an animal comprising: a pipe and a cage,
the pipe having a top end and a bottom end; the pipe comprising a plurality of slots open ended at the top end of the pipe,
the pipe having an outer diameter and an inner diameter,
the cage being disposed within the inner diameter of the pipe, the cage being comprised of an anchor attached to at least two vertical rods, each vertical rod having an L-shaped fin, the anchor lying flat across the inner diameter of the pipe and located towards the bottom end of the pipe;
the vertical rods projecting upwards toward the top end of the pipe,
whereby each L-shaped fin projects through and rests on each slot of the pipe, whereby each L-shaped fin is capable of receiving a snare cable loop, such that the snare cable loop wraps around the outer diameter of the pipe with tension.

2. The device of claim 1, wherein the anchor is a square.

3. The device of claim 1 further comprised of a bottom stage attached to the bottom end of the pipe.

4. The device of claim 1 wherein the plurality of slots equals four.

5. A method for snaring an animal comprising:
attaching a bait to a cage of a device, said device comprised of a pipe and the cage, the pipe having a top end and a bottom end; the pipe comprising a plurality of slots open ended at the top end of the pipe, the pipe having an outer diameter and an inner diameter, the cage being disposed within the inner diameter of the pipe, the cage being comprised of an anchor attached to at least two vertical rods, each vertical rod having an L-shaped fin, the anchor lying flat across the inner diameter of the pipe and located towards the bottom end of the pipe;
the vertical rods projecting upwards toward the top end of the pipe, whereby each L-shaped fin projects through and rests on each slot of the pipe, whereby each L-shaped fin is capable of receiving a snare cable loop, such that the snare cable loop wraps around the outer diameter of the pipe with tension, the snare cable loop being comprised of a loop, a lock, a straight slack and a compression spring;
wherein when the animal reaches in with an appendage to grab the bait and pulls the cage up, whereby causing the L-shaped fins to rise up out of the slots above the top end of pipe, the momentum generated actuates the compression spring of the straight slack, causing the snare cable loop to rise up off of the L-shaped fins and around the appendage of the animal with the snare cable loop then releasing the tension and closing on the appendage of the animal via the lock capturing the animal without harming the animal.

6. The method of claim 5 wherein the bait is placed within the cage and attached on top of the anchor.

7. The claim 5 wherein the bait is placed under the cage and attached to and below the anchor.

* * * * *